United States Patent

Wang et al.

[11] Patent Number: 6,045,948
[45] Date of Patent: Apr. 4, 2000

[54] ADDITIVES FOR IMPROVING CYCLE LIFE OF NON-AQUEOUS RECHARGEABLE LITHIUM BATTERIES

[75] Inventors: Yu Wang, Coquitlam; Meijie Zhang, Burnaby; Ulrich von Sacken; Brian Michael Way, both of Coquitlam, all of Canada

[73] Assignee: NEC Moli Energy (Canada) Limited, Maple Ridge, Canada

[21] Appl. No.: 09/033,707

[22] Filed: Mar. 3, 1998

[30] Foreign Application Priority Data

Sep. 18, 1997 [CA] Canada ................... 2215756

[51] Int. Cl.⁷ .................................. H01M 10/24
[52] U.S. Cl. ............... 429/231.95; 429/199; 429/324
[58] Field of Search ................... 429/199, 200, 429/120, 62, 207, 324, 231.95

[56] References Cited

U.S. PATENT DOCUMENTS

| | | | |
|---|---|---|---|
| 3,915,743 | 10/1975 | Lauck | 429/231.95 |
| 5,437,944 | 8/1995 | Kita et al. | 429/231.95 |
| 5,783,333 | 7/1998 | Mayer | 429/223 |

FOREIGN PATENT DOCUMENTS

| | | |
|---|---|---|
| 2150877 | 6/1995 | Canada . |
| 2163187 | 11/1995 | Canada . |
| 2175755 | 5/1996 | Canada . |
| 2196493 | 1/1997 | Canada . |
| 776058 | 5/1997 | European Pat. Off. . |
| 805504 | 11/1997 | European Pat. Off. . |
| 59-154767 | 9/1984 | Japan . |
| 2-158059 | 6/1990 | Japan . |
| 2158059 | 6/1990 | Japan . |
| 6-279195 | 10/1994 | Japan . |
| 7-105955 | 4/1995 | Japan . |
| 7-142055 | 6/1995 | Japan . |
| 9-120825 | 5/1997 | Japan . |
| 9-139232 | 5/1997 | Japan . |
| 97/16862 | 5/1997 | WIPO . |

*Primary Examiner*—Maria Nuzzolillo
*Assistant Examiner*—Monique M. Wills
*Attorney, Agent, or Firm*—Synnestvedt & Lechner LLP

[57] ABSTRACT

The loss in delivered capacity (fade rate) after cycling non-aqueous rechargeable lithium batteries can be reduced by incorporating a small amount of an improved additive in the battery. Improved additives include boron trifluoride ($BF_3$), fluoboric acid ($HBF_4$), or complexes thereof. The invention is particularly suited to lithium ion batteries. Complexes comprising $BF_3$ and dietyl carbonate or ethyl methyl carbonate can be prepared which are particularly effective additives. Preferably, the additive is dissolved in the electrolyte.

35 Claims, 4 Drawing Sheets

ADDITIVES FOR IMPROVING CYCLE LIFE OF NON-AQUEOUS RECHARGEABLE LITHIUM BATTERIES

FIELD OF THE INVENTION

This invention pertains to non-aqueous rechargeable lithium batteries and to methods for improving the performance thereof. Specifically, it pertains to the use of boron trifluoride ($BF_3$) or complexes containing $BF_3$ as an electrolyte additive in order to improve the capacity delivered from lithium ion batteries after extended cycling.

BACKGROUND OF THE INVENTION

Many varied types of non-aqueous rechargeable lithium batteries are used commercially for consumer electronics applications. Typically, these batteries employ a lithium insertion compound as the active cathode material, a lithium containing material of some sort (eg. pure lithium metal, lithium alloy, lithium insertion compound) as the active anode material, and a non-aqueous electrolyte. An insertion compound is a material that can act as a host solid for the reversible insertion of guest atoms (in this case, lithium atoms).

Lithium ion batteries use two different insertion compounds for the active cathode and anode materials. Presently available lithium ion batteries are high voltage systems based on $LiCoO_2$ cathode and coke or graphite anode electrochemistries. However, many other lithium transition metal oxide compounds are suitable for use as the cathode material, including $LiNiO_2$ and $LiMn_2O_4$. Also, a wide range of carbonaceous compounds is suitable for use as the anode material. These batteries employ non-aqueous electrolytes comprising $LiBF_4$ or $LiPF_6$ salts and solvent mixtures of ethylene carbonate, propylene carbonate, diethyl carbonate, and the like. Again, numerous options for the choice of salts and/or solvents in such batteries are known to exist in the art.

The excellent reversibility of this insertion makes it possible for lithium ion batteries to achieve hundreds of battery cycles. However, a gradual loss of lithium and/or buildup of impedance can still occur upon such extended cycling for various reasons and particularly at higher operating voltages. This in turn typically results in a gradual loss in delivered capacity with cycle number. Researchers in the art have devoted substantial effort to reducing this loss in capacity. For instance, co-pending Canadian patent application serial number 2,150,877, filed Jun. 2, 1995, and titled 'Use of $P_2O_3$ in Non-aqueous Rechargeable Lithium Batteries' discloses a means for reducing this loss which involves exposing the electrolyte to $P_2O_5$. However, $P_2O_5$ shows at best only limited solubility in typical non-aqueous electrolytes and can be somewhat awkward to use in practice. Alternatives which are soluble may be more convenient, but it is unclear why such exposure is effective and hence what compounds might serve as effective alternatives.

$B_2O_3$ is a common chemical that is extensively used in the glass industry, and its properties are well known. $B_2O_3$ has also been used in the lithium battery industry for a variety of reasons. In most cases, the $B_2O_3$ is used as a precursor or reactant to prepare some other battery component. However, Japanese published patent application 07-142055 discloses that lithium batteries can show improved stability characteristics to high temperature storage when using lithium transition metal oxide cathodes which contain $B_2O_3$. Also, co-pending Canadian patent application serial number 2,175,755, filed May 3, 1996, and titled 'Use of $B_2O_3$ additive in Non-aqueous Rechargeable Lithium Batteries' discloses that $B_2O_3$ additives can be used to reduce the rate of capacity loss with cycling in rechargeable lithium batteries and that this advantage can be obtained by having the additive dissolved in the electrolyte. However, the reason that the additive resulted in an improvement with cycling was not understood. In a like manner, Japanese published patent application 09-139232 also discloses that the use of $B_2O_3$, or possibly certain other B containing compounds, can improve the cycling and storage characteristics of lithium rechargeable batteries.

Certain other compounds containing boron, oxygen, carbon, and hydrogen have been used historically in battery and/or fuel cell applications. For instance, trimethyl borate has been used as a precursor in a process to make an electrode substrate (as in Japanese laid-open patent application 07-105955, a precursor B-containing compound was kneaded in with the other electrode components before heat treating the mixture to 1000 degrees C.). Boron-oxygen-carbon-hydrogen containing compounds have also been used in the preparation of lithium haloboracite (a lithium-boron-oxygen-halogen containing material) solid electrolyte films for battery usage (as in Japanese laid-open patent application 06-279195).

Recently, researchers have discovered that certain compounds containing boron, oxygen, carbon, and hydrogen can serve as improved electrolyte additives in rechargeable lithium batteries. For instance, in Canadian patent application serial no. 2,196,493, filed Jan. 31, 1997 by a common applicant and having the same title as the instant application, fade rate reducing additives for rechargeable lithium battery electrolytes are disclosed. The fade rate reducing additives comprised a $(BO)_3$ boroxine ring.

Further, in international patent application WO 97/16862 by C. A. Angell et al., improved electrolytes for lithium rechargeable batteries are disclosed wherein the solvent of the electrolyte consists predominantly of a liquid boron electrolyte solvent. The disclosed boron electrolyte solvents all comprise boron atoms which are bonded to two or three oxygen atoms. The electrolytes showed a wider electrochemical stability window than other conventional electrolytes.

Also, Japanese published patent application number 09-120825 of Sanyo discloses the use of various boronate esters and/or borinate esters in lithium secondary batteries in order to suppress self discharge during storage.

For various historical reasons, $BF_3$ and complexes containing $BF_3$ have also been employed in primary or non-rechargeable batteries before. (Herein, the term 'complex' is defined as a 'complex substance in which the constituents are more intimately associated than in a simple mixture' in accordance with the definition in Webster's Ninth New Collegiate Dictionary, 1984, Merriam-Webster Inc.) In U.S. Pat. No. 3,915,743, Varta discloses a primary battery having a lithium metal anode, a sulfur cathode, and which operates below about 2.5 V. The battery comprised a $BF_3$ adduct of organic solvents (such as dimethyl carbonate or 1,2 dimethoxy ethane) to prevent the formation of polysulphides.

Further, Japanese published patent application number 02-158059 of Tokai Carbon Co. discloses primary or non-rechargeable batteries comprising an aromatic nitrogen compound dissolved in the electrolyte. In examples in this application, $BF_3$ was used as an electrolyte additive.

$BF_3$ has also been employed in the assembly of rechargeable lithium batteries before. In Japanese published patent application number 59-154767, Hitachi Maxell discloses a rechargeable lithium battery containing a Li halide salt and $BF_3$ wherein the $BF_3$ reacts with the lithium halide salt to form a product which has advantages over $LiBF_4$ salt. In this disclosure, residual $BF_3$ is removed prior to assembling the battery. Thus, unreacted $BF_3$ does not remain in the electrolyte. The resulting electrolyte is more stable at high temperature. In the disclosure, it was mentioned that the complex $DME.BF_3$ might be used instead of $BF_3$.

While the preceding prior art may employ $BF_3$ and/or complexes containing $BF_3$ in primary batteries or in the assembly of secondary batteries, it appears that $BF_3$ and/or complexes containing $BF_3$ have not been used for purposes of improving the fade rate of rechargeable lithium batteries.

SUMMARY OF THE INVENTION

Rechargeable batteries exhibit a loss in delivered capacity as a function of the number of charge/discharge cycles. Herein, the fractional loss of capacity per cycle is referred to as the capacity fade rate. The instant invention includes non-aqueous rechargeable lithium batteries having improved fade rates and methods for achieving the reduced fade rate.

Non-aqueous rechargeable lithium batteries generally comprise a lithium insertion compound cathode, a lithium or lithium compound anode, and a non-aqueous electrolyte comprising a lithium salt dissolved in a non-aqueous solvent. Incorporating a small amount of an additive comprising a boron fluorine compound selected from the group consisting of $BF_3$, $BF_3$ complexes, $HBF_4$, and $HBF_4$ complexes in the batteries can result in improved fade rate characteristics. Preferably, the additive is dissolved in the electrolyte. Such additives therefore serve to function as fade rate reducing compounds.

In additive complexes of the invention, the component complexed with $BF_3$ or $HBF_4$ is desirably relatively inert or is itself advantageous to use with respect to the components and function of the non-aqueous rechargeable lithium battery. Thus, the complexed component can itself be a suitable non-aqueous battery solvent such as a linear or cyclic organic carbonate (eg. diethyl carbonate or ethyl methyl carbonate), an ether (eg. diethyl ether), a lactone, or the like. However, in small quantities, complexed components such as phosphoric acid, which is generally considered to be undesirable, may still be employed.

Improved fade rates can be achieved for batteries employing conventional lithium ion battery electrochemistries. Thus, the cathode can be a lithium transition metal oxide, in particular the layered compound $LiCoO_2$. The anode can be a carbonaceous insertion compound anode, in particular graphite. The electrolyte can contain a lithium salt having a fluorine containing anion, such as $LiPF_6$, dissolved in an organic carbonate solvent, in particular mixtures containing ethylene carbonate, propylene carbonate, ethyl methyl carbonate, and/or diethyl carbonate solvents. The electrolyte can contain other additives, included for other functions, without interfering with the additive of the invention. For instance, the electrolyte can additionally comprise biphenyl for safety related reasons.

In principle, the fade reducing additive may be incorporated in the battery in a variety of ways. However, the additive is preferably dispersed inside the battery. Also, the additive may be hygroscopic which makes it more difficult to deal with during battery manufacture. For these reasons, the additive is preferably dissolved in the electrolyte.

Conventional assembly methods can be used to prepare a battery of the invention, except that an additional step is required wherein an amount of one of the aforementioned fade reducing additive compounds is incorporated in the battery as well. A preferred method for accomplishing this is simply to dissolve a suitable amount of additive into the electrolyte solvent prior to using the electrolyte during assembly of the battery.

Incorporating an amount of fade reducing additive in the range from greater than about 1% to about 5% of the weight of the electrolyte can be effective in improving capacity fade rate. Preferably however, a sufficiently small amount of fade reducing additive is incorporated such that other desirable bulk properties of the battery are not adversely affected, eg. such that the thermal stability threshold of the battery remains essentially unchanged. In this way, other bulk properties such as the relative safety of the battery are not compromised by the inclusion of the additive. For certain choices of fade reducing additives, incorporating an amount less than about 2.5% of the weight of the electrolyte can be effective in improving capacity fade rate without compromising fundamental battery safety.

The additives of the invention are particularly suitable for use in lithium ion batteries which operate at very high voltages (operating potentials circa 4.2 volts or greater) wherein the electrolytes are subjected to oxidation and reduction extremes.

BRIEF DESCRIPTION OF THE DRAWINGS

FIGS. 3a, b, and c show discharge and charge profiles for cycle numbers 10 and 200 of a Comparative battery and of batteries of Inventive Example i) having 1.5% and 5% $BF_3$-diethyl carbonate complex additive respectively.

FIG. 7 shows the discharge capacity versus cycle number data for various batteries which were cycle tested at 21° C.

to a 4.2 V upper cutoff without high temperature storage. Data for batteries of Inventive Examples i), iv), and v) having $BF_3$-diethyl carbonate complex, $BF_3$-diethyl etherate, and $HBF_4$-diethyl etherate additives respectively along with that for a Comparative battery having no additive are shown. At this cutoff voltage, the batteries containing diethyl etherate complexes have a fade rate which is inferior to that of the Comparative battery.

DETAILED DESCRIPTION OF SPECIFIC EMBODIMENTS OF THE INVENTION

Several compounds with boron-oxygen bonding in their structure have already been identified in the art as additives which can improve the capacity fade rate of non-aqueous lithium rechargeable batteries in general. We have discovered that a fade rate improvement can also be achieved using boron-fluorine additive compounds selected from the group consisting of $BF_3$, $BF_3$ complexes, $HBF_4$, and $HBF_4$ complexes.

Typically, this type of battery employs a lithium insertion compound as the cathode and one of a variety of lithium containing materials as the anode. Possible lithium containing materials include lithium metal, lithium alloys, and lithium insertion compounds. Preferred embodiments are lithium ion batteries wherein the anode is also a lithium insertion compound. Presently, the majority of commercial lithium ion batteries employ transition metal oxide cathodes (either $LiCoO_2$, $LiNiO_2$, or $LiMn_2O_4$) and carbonaceous anodes (either coke or graphite).

Preferred electrolytes for lithium ion batteries comprise a lithium salt (typically having a fluorine containing anion) dissolved in a mixture of non-aqueous organic carbonate solvents (such as ethylene carbonate, propylene carbonate, ethyl methyl carbonate, and/or diethyl carbonate). $LiPF_6$ is a typical choice for the lithium salt since it can result in a safer, more stable electrolyte than would some other salt choices.

Generally, only a small amount (circa 1% by weight of the electrolyte) of additive compound is incorporated in the battery, and so the other bulk characteristics of the electrolyte can remain largely unaffected. In principle, the additive may be incorporated into the battery in various ways (eg. as a solid dispersed in an electrode). Preferably however, the additive is dissolved in the electrolyte before assembly.

As a result, the additive is well dispersed throughout the battery immediately after assembly. Also, this method can make it easier to handle the additive during manufacture if the additive is hygroscopic or difficult to incorporate into either electrode for some reason.

$BF_3$ is functionally a preferred additive but it is somewhat difficult to work with since it is a hazardous gas under ambient conditions. In principle, a gas can be introduced into the battery container under pressure and then sealed inside. Alternately, if a gas is soluble enough in the liquid electrolyte, it might be dissolved therein and added in that way. ($BF_3$ may be dissolved in halogenated or saturated hydrocarbons and/or aromatic compounds.) However, a typical electrolyte filling process for lithium batteries involves exposing the electrolyte to vacuum for brief periods whereupon a variable, unknown, and undesirable amount of dissolved gaseous additive may be lost.

For handling and manufacturing purposes therefore, it is preferred to employ a suitable complex of $BF_3$ instead. Such complexes can be solid under ambient conditions. We have found that solid $BF_3$ complexes can be formed with some of the solvents employed in conventional lithium rechargeable batteries (eg. linear or cyclic organic carbonates). For instance, both $BF_3$-diethyl carbonate and $BF_3$-etliyl methyl carbonate complexes can be formed. Thus, complexes which are relatively much easier to handle can be used as additives without introducing any additional foreign chemicals other than $BF_3$ itself.

Ideally, it seems that the additive should be completely chemically compatible with the battery components (i.e. relatively inert with respect to the cathode, anode, and electrolyte and therefore should not significantly interfere with the normal functioning of the battery). However, we have found that other additives might also be employed to advantage even though they contain certain chemical groups that are not generally considered to be compatible with the battery components. For example, protons or hydrogen ions are generally avoided in these otherwise aprotic non-aqueous batteries. However, if only a small amount of additive is employed, the net effect of using an additive with an undesirable chemical group can still be positive. As an indication of this, additives which include phosphoric acid or $HBF_4$ and complexes thereof have been observed to improve fade rate as well.

Nonetheless, not every additive can be expected to be suitable for use in all circumstances. For instance, certain complex additives may work well within a given range in the operating potential of a battery but not perhaps over a wider range in operating potential. Further, it should be noted that the presence of additive compound can result in an increase in the irreversible capacity loss experienced during the first charging of such batteries. Also, the use of too much additive compound can adversely affect the thermal stability threshold of such batteries. And, an excessive amount of dissolved additive compound could be expected to adversely affect electrolyte conductivity and hence battery rate capability. Thus, it is important not only to determine the capacity fade rate as a function of amount of additive in any particular embodiment, but also to determine the effects of amount of additive on these other important battery characteristics. Some non-inventive characterization trials must therefore be performed in order to arrive at a sensible trade off between fade rate improvement and these other characteristics.

The invention relates to battery constructions with one of the aforementioned additive compounds dissolved in the electrolyte. Various battery configurations are suitable, including prismatic formats or miniature coin cells. A preferred conventional construction for a lithium ion type product is depicted in the cross-sectional view of a spiral-wound battery in FIG. 1. A jelly roll 4 is created by spirally winding a cathode foil 1, an anode foil 2, and two microporous polyolefin sheets 3 that act as separators.

Figure 1:
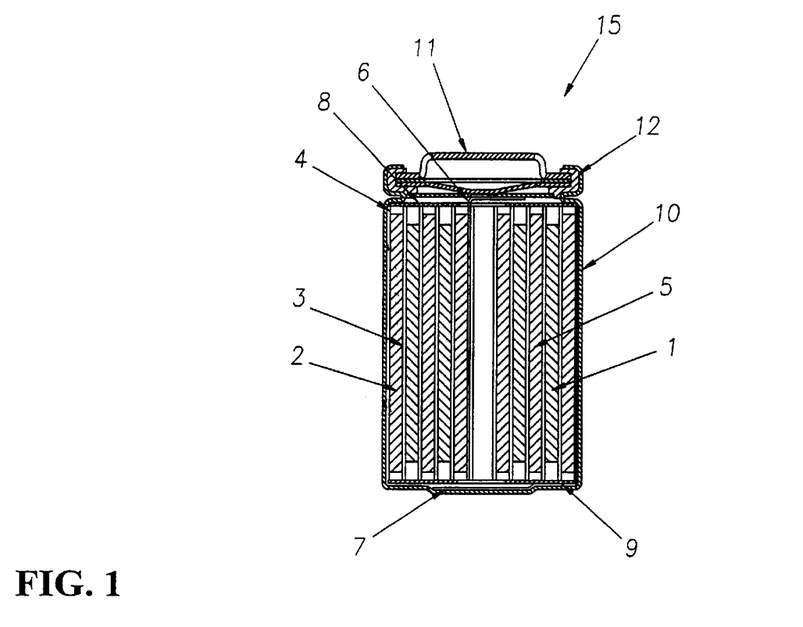
FIG. 1 depicts a cross-sectional view of a preferred embodiment of a cylindrical spiral-wound lithium ion battery.

Cathode foils are prepared by applying a mixture of a suitable powdered (about 10 micron size typically) cathode material, such as a lithiated transition metal oxide, possibly other powdered cathode material if desired, a binder, and a conductive dilutant onto a thin aluminum foil. Typically, the application method first involves dissolving the binder in a suitable liquid carrier. Then, a slurry is prepared using this solution plus the other powdered solid components. The slurry is then coated uniformly onto the substrate foil. Afterwards, the carrier solvent is evaporated away. Often, both sides of the aluminum foil substrate are coated in this manner and subsequently the cathode foil is calendered.

Anode foils are prepared in a like manner except that a powdered (also typically about 10 micron size) carbonaceous insertion compound is used instead of the cathode material and thin copper foil is usually used instead of aluminum. Anode foils are typically slightly wider than the cathode foils in order to ensure that anode foil is always opposite cathode foil.

The jelly roll 4 is inserted into a conventional battery can 10. A header 11 and gasket 12 are used to seal the battery 15. The header may include safety devices if desired such as a combination safety vent and pressure operated disconnect device. Additionally, a positive thermal coefficient device (PTC) may be incorporated into the header to limit the short circuit current capability of the battery. The external surface of the header 11 is used as the positive terminal, while the external surface of the can 10 serves as the negative terminal.

Appropriate cathode tab 6 and anode tab 7 connections are made to connect the internal electrodes to the external terminals. Appropriate insulating pieces 8 and 9 may be inserted to prevent the possibility of internal shorting.

Lithium ion batteries of the invention have a fade reducing additive compound incorporated therein in order to improve the fade rate. Preferably, the additive is dissolved in the electrolyte which can be accomplished in a variety of ways. However, the most straightforward and thus the preferred method simply involves dissolving a suitable amount of an additive in the electrolyte solvent before filling the battery with the electrolyte. Then, prior to crimping the header 11 to the can 10 and sealing the battery, the electrolyte 5 comprising the fade reducing additive is added to fill the porous spaces in the jelly roll 4.

At this point, the battery is in a fully discharged state. Generally, an electrical conditioning step, involving at least a single complete recharge of the battery, is performed as part of the overall assembly. One of the reasons for so doing is that some initial irreversible processes take place on this first recharge. For instance, a small amount of lithium is irreversibly lost during the first lithiation of the carbonaceous anode.

Advantages of the invention can be achieved using modest amounts of fade reducing additive compound. In the examples to follow, desirable results were obtained using of order of 1% additive by weight in the electrolyte. As mentioned above, some tradeoffs in other desirable battery characteristics can be expected if excessive amounts of additive compound are employed. For instance, care must be taken not to unacceptably alter the thermal stability threshold of the battery by using the additive. Also, care must be taken not to unacceptably increase the irreversible capacity loss experienced in lithium ion batteries by using the additive. Some straightforward quantification trials usually would be required in order to select an appropriate amount of additive compound to use.

Certain additives of the invention can be obtained commercially (eg. boron trifluoride diethyl etherate). However, some preferred additives, particularly the $BF_3$-linear organic carbonate complex compounds, presently are not available and these must be prepared. Solid $BF_3$-linear organic carbonate complexes of the invention can be prepared simply by passing $BF_3$ gas through the linear organic carbonate in the liquid phase to form a suspension. Then, the suspension is separated from the excess carbonate liquid, leaving a $BF_3$-linear organic carbonate complex solid.

It can be advantageous to cool the liquid while passing $BF_3$ gas therethrough since the reaction is exothermic and the heat generated might lead to the formation of undesirable by-products or to the evaporation of the liquid carbonate. After forming a suspension of the $BF_3$-linear organic carbonate, it can be advantageous to heat the suspension in order to recrystallize the product complex. The suspended solids can then be removed by conventional means, such as filtration. This method is suitable for preparing $BF_3$-diethyl carbonate and $BF_3$-ethyl methyl carbonate complexes.

At this time, the reason for the fade rate improvement using such additive compounds is unclear. Without being bound by theory, a possible explanation is that the presence of these additive compounds in the electrolyte affects the passivation/decomposition reactions which occur at one or both of the electrodes. (These additives are also good scavengers of water. However, the mere removal of water is not believed to lead to the long term fade rate improvement obtained with these additives.) Passivation films can be initially formed as a result of these reactions which can then inhibit the further decomposition of electrolyte. Further decomposition may consume active lithium, and also result in the formation of decomposition products which, in turn, may coat the electrode material or otherwise adversely impede ionic transport thereby resulting in an increase in battery impedance (and hence result in a loss of deliverable capacity at a given rate). The presence of the additive compounds may result in the production of a chemically different passivation film and/or affect the rate of further decomposition reactions.

In the aforementioned Canadian patent application serial no. 2,196,493, it was disclosed that trimethoxyboroxine was a preferred fade reducing additive. In the Illustrative Example following, it was however determined that this additive is decomposed early on during cycling testing of a battery and that $HBF_4$ and $BF_3$ were suspected of being decomposition products thereof. The trimethoxyboroxine in these batteries may react perhaps with the small amount of water present and/or the lithium salt. Since the scavenging of the small amount of water itself was not expected to significantly improve the fade rate and the fade rate was nonetheless improved, it was speculated that the presence of decomposition products of the trimethoxyboroxine found in the electrolyte might be responsible for the fade rate improvement. Thus, decomposition products like $HBF_4$ and $BF_3$ may themselves be fade rate reducing additives.

If the anion of the lithium salt is involved in an advantageous decomposition reaction, the choice of salt may thus influence the extent of the fade rate improvement observed. Further, the additives of the invention may play a role in other chemical reactions too. For instance, in the following Examples, an optional biphenyl additive was employed to activate a safely device during overcharge abuse. The additives of the invention may also help to stabilize the slow degradation of the biphenyl additive and thereby also contribute to fade rate improvement.

The following Examples are provided to illustrate certain aspects of the invention but should not be construed as limiting in any way. 18650 size cylindrical batteries (18 mm diameter, 650 mm height) were fabricated as described in the preceding and shown generally in FIG. 1. Cathodes 1 comprised a mixture of $LiCoO_2$ powder, a carbonaceous conductive dilutant, and polyvinylidene fluoride (PVDF) binder that was uniformly coated on both sides of a thin aluminum foil. Anodes 2 were made using a mixture of a spherical graphitic powder plus Super S (trademark of Ensagri) carbon black and PVDF binder that was uniformly coated on thin copper foil. Either Setela® or Celgard® 2300 microporous polyethylene film was used as the separators 3. The electrolytes 5 employed were solutions of 1M $LiPF_6$ salt dissolved in a solvent mixture of organic carbonates. The choice of $LiPF_6$ salt can result in a safer, more stable electrolyte than would other salt choices.

To protect against hazardous conditions on overcharge of the battery, the header of these batteries included a pressure operated electrical disconnect device. The electrolytes employed also contained 2.5% biphenyl additive by weight to act as a gassing agent for purposes of activating the electrical disconnect device (in accordance with the disclosure in co-pending Canadian Patent Application Serial No. 2,163,187, filed Nov. 17, 1995, titled 'Aromatic Monomer Gassing Agents for Protecting Non-aqueous Lithium Batteries Against Overcharge', by the same applicant). Finally, the electrolytes 5 employed in examples of the invention also contained certain fade reducing additive compounds in amounts ranging up to about 5% by weight of the electrolyte. Approximately 4 cc of electrolyte was used in each battery.

For electrical testing, batteries were thermostatted at a constant temperature (±1° C.) as indicated below. Cycling was performed using a current limited (1 or 1.5 A maximum as indicated below), constant voltage charge (either 4.1 or 4.2 volts as indicated below) for 2.5 hours and a constant 1 or 1.5 A current discharge to a 2.5 volt cutoff. (Note: For purposes of observing changes in battery impedance, a prolonged, low rate charging or discharging was performed every 20 cycles. Subsequent discharge capacities may then be significantly different from than the previous ones. Many of these points have been omitted from the data presented below for purposes of clarity. However, this type of testing can introduce a noticeable discontinuity in the capacity versus cycle number data curves.)

COMPARATIVE EXAMPLES

Several 18650 batteries were constructed as described above with an electrolyte comprising ethylene carbonate (EC), propylene carbonate (PC), diethyl carbonate (DEC) solvents in a volume ratio of 30/20/50 respectively and no fade reducing additive. The batteries were then electrically conditioned and tested in various ways (in sets of two or more to check reproducibility) for purposes of comparing performance and safety results with those of batteries comprising fade reducing additives.

Figure 2:
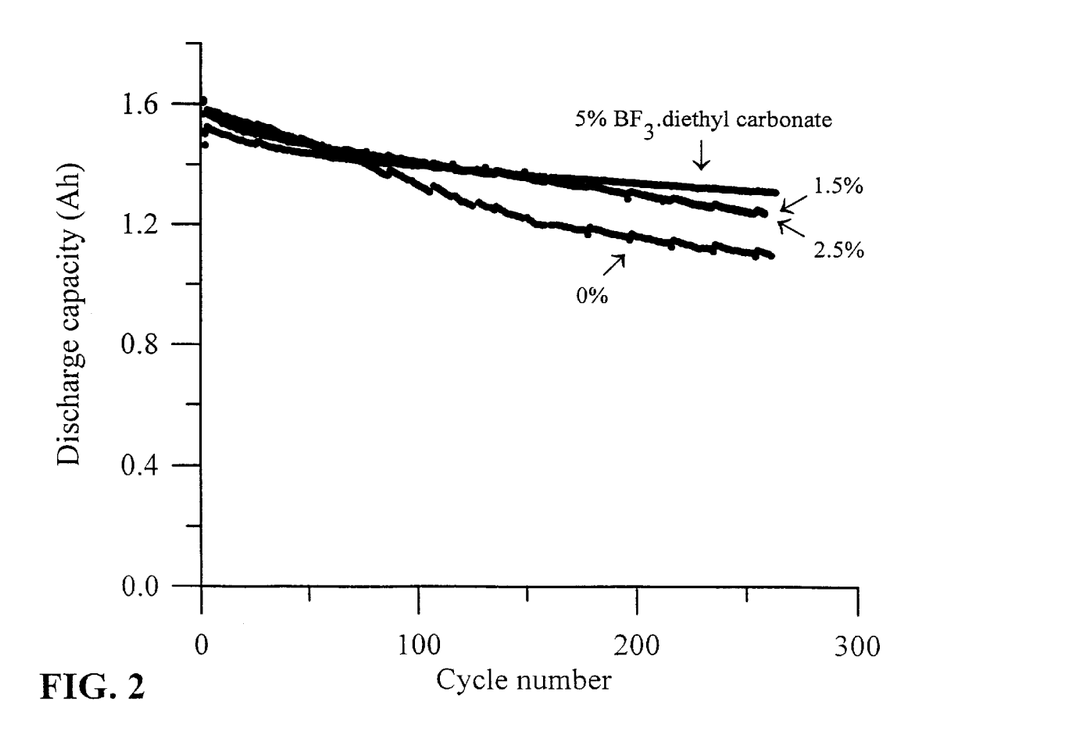
FIG. 2 shows the discharge capacity versus cycle number data for batteries of Inventive Example i) which were cycle tested at 40° C. to a 4.2 V upper cutoff. Data for batteries having 1.5%, 2.5%, and 5% $BF_3$-diethl carbonate complex additive along with that for a Comparative battery having no additive are shown. Note that the data for batteries having 1.5% and 2.5% additive overlap and cannot be distinguished in this Figure.
Figure 3:
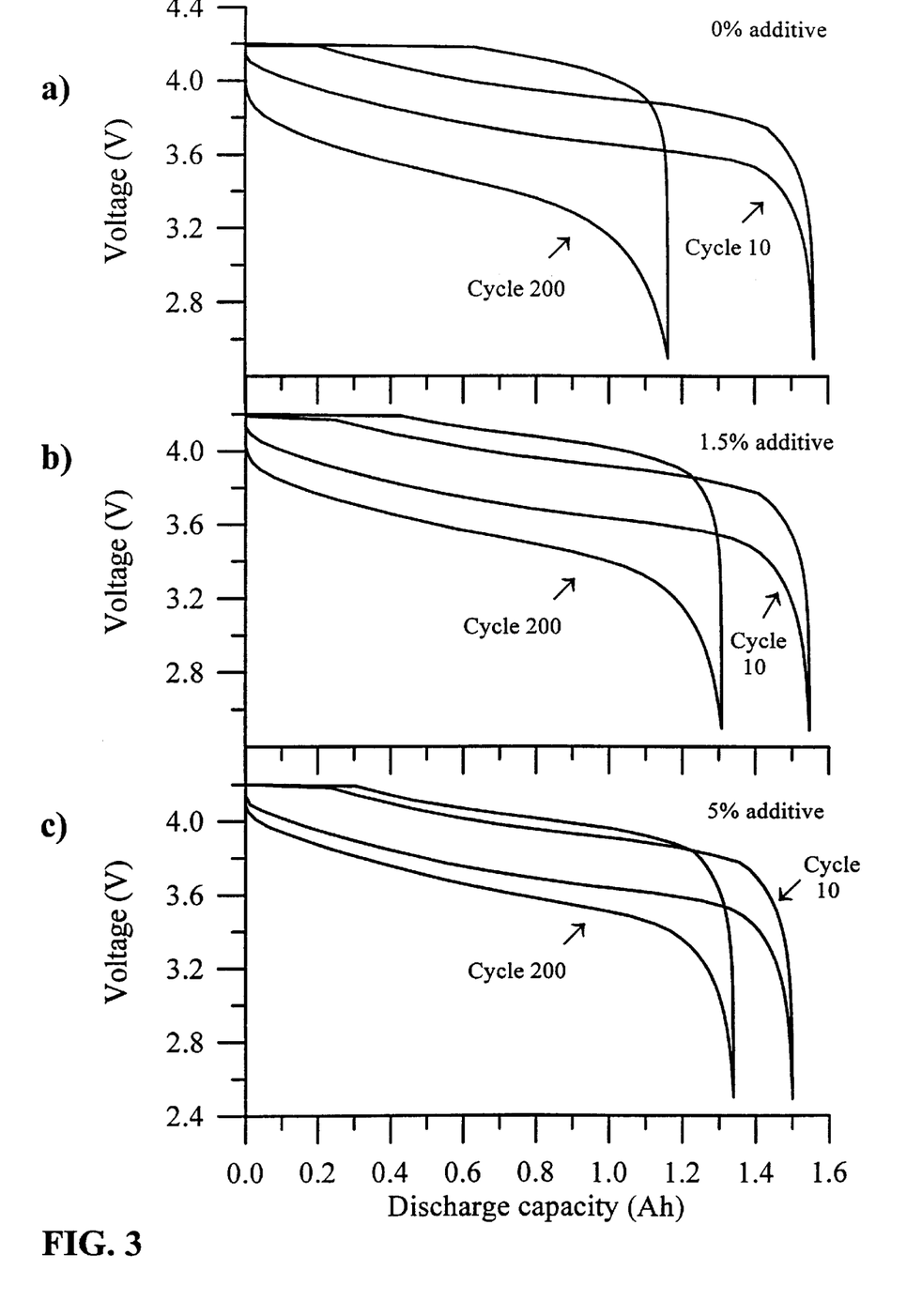

FIG. 2 shows the discharge capacity versus cycle number data for a representative battery which was cycle tested at 40° C. to a 4.2 V upper cutoff. Discharge and charge currents were 1 A and limited to 1 A maximum respectively. FIG. 3a shows discharge and charge profiles for cycle numbers 10 and 200 of this representative battery. A significant increase in impedance has occurred in this battery with cycling.

Figure 5:
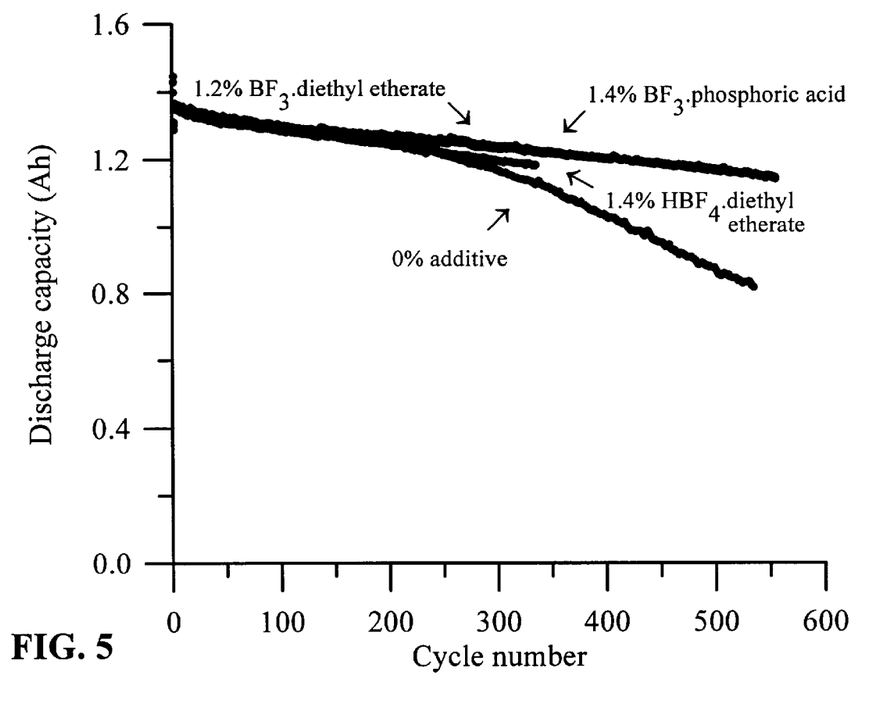
FIG. 5 shows the discharge capacity versus cycle number data for batteries of Inventive Examples iii), iv), and v) which were cycle tested at 21° C. to a 4.1 V upper cutoff. Data for batteries having $BF_3$-phosphoric acid, $BF_3$-diethyl etherate, and $HBF_4$-diethyl etherate additives respectively along with that for a Comparative battery having no additive are shown. Note that the data for the $BF_3$-phosphoric acid and $BF_3$-diethyl etherate overlap one another and cannot be distinguished in this Figure.
Figure 7:
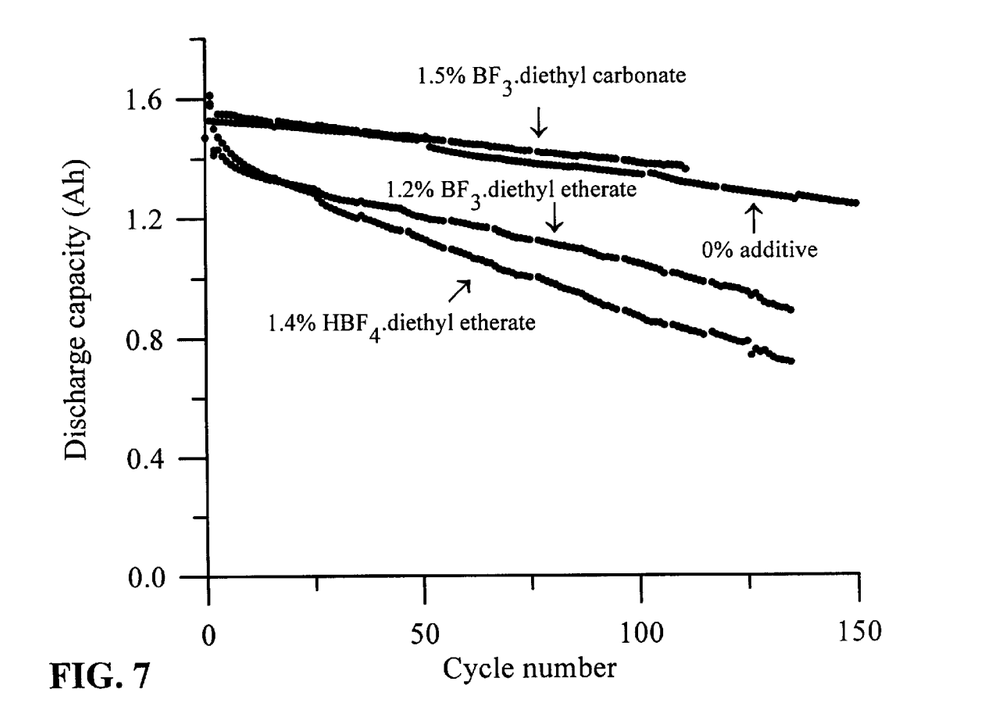

FIG. 5 shows the discharge capacity versus cycle number data for a representative battery which was cycle tested at 21° C. to a 4.1 V upper cutoff at similar currents. FIG. 7 shows the discharge capacity versus cycle number data for a representative battery which was cycle tested at 21° C. to a 4.2 V upper cutoff. Here, the discharge and charge currents were 1.5 A and limited to 1.5 A maximum respectively.

Figure 4:
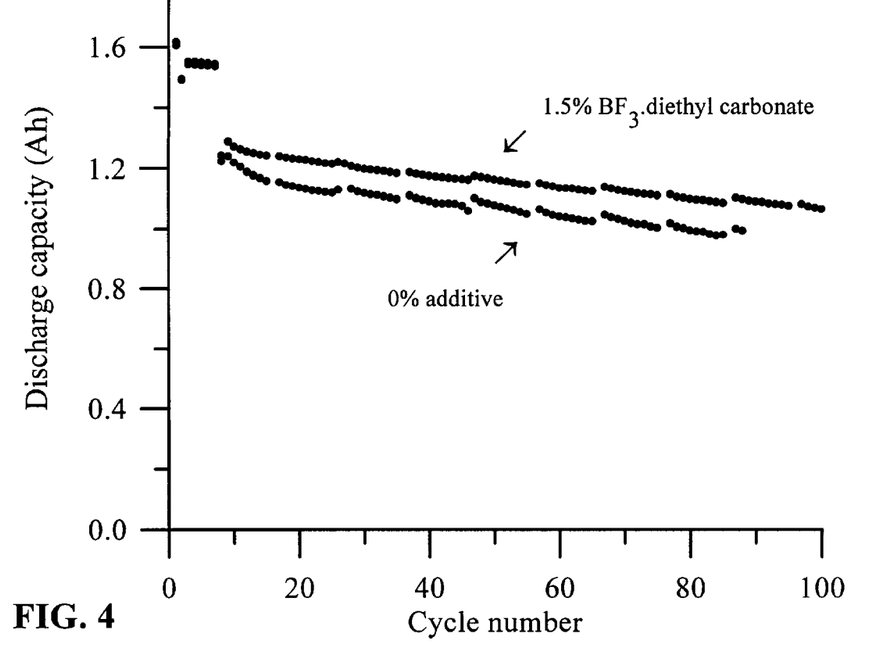
FIG. 4 shows the discharge capacity versus cycle number data for a battery of Inventive Example i) which was cycle tested at 21° C. to a 4.2 V upper cutoff and had been stored at 60° C. for 7 days. Data for a battery having 1.5% $BF_3$-diethyl carbonate complex additive along with that for a Comparative battery having no additive are shown.
Figure 6:
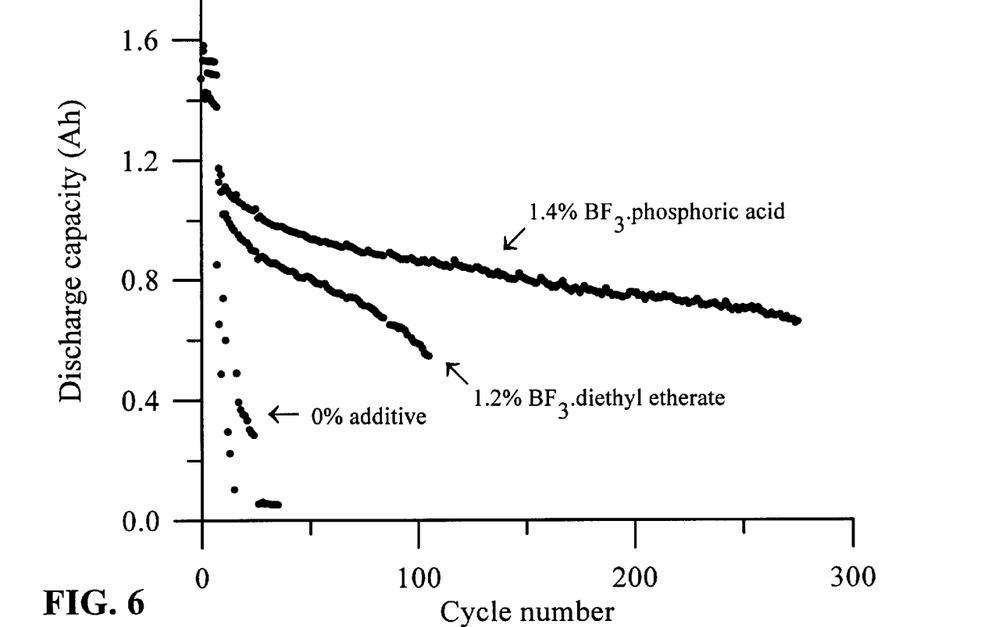
FIG. 6 shows the discharge capacity versus cycle number data for batteries of Inventive Examples iii) and iv) which were cycle tested at 21° C. to a 4.2 V upper cutoff and had been stored at 85° C. for 10 hours. D for batteries having $BF_3$-phosphoric acid and $BF_3$-diethyl etherate additives respectively along with that for a Comparative battery having no additive are shown.

Some tests involved storing batteries at elevated temperature after the first ten or so cycles. This high temperature storage can adversely affect subsequent cycling performance. FIG. 4 shows the discharge capacity versus cycle number data for a representative battery which was cycle tested at 21° C. to a 4.2 V upper cutoff and had been stored at 60° C. for 7 days. (Discharge and charge currents here were 1 A and limited to 1 A maximum respectively.) FIG. 6 shows the discharge capacity versus cycle number data for a representative battery which was cycle tested at 21° C. to a 4.2 V upper cutoff and had been stored at 85° C. for 10 hours. (Here, discharge and charge currents were 1.5 A and limited to 1.5 A maximum respectively.) In both cases, the high temperature storage has significantly affected subsequent cycling.

As shown in co-pending Canadian patent application serial number 2,175,755, the use of a $B_2O_3$ additive can adversely affect the thermal threshold stability of such batteries. Consequently, it may be important not to use an excessive amount of additive. For purposes of comparison, several batteries were electrically conditioned, charged to 4.2 V, and then exposed to a temperature of 150° C. in a convection oven (a 'hot box' thermal stability test). Since the batteries were not heat sunk to the oven, exothermic chemical reactions can be triggered within the batteries which, in turn, can result in further heating and potential thermal run away. The thermal response of each battery was monitored. In this 'hot box' test, the safety vent of the Comparative batteries activated due to pressure buildup but no fire nor violent venting was observed. Thermal run away was thus avoided.

INVENTIVE EXAMPLES i) $BF_3$-diethyl Carbonate Complex Additive

A $BF_3$-diethyl carbonate complex compound was prepared in the following manner. $BF_3$ gas was passed through liquid diethyl carbonate under nitrogen at about 0° C. for about 20 minutes. The resulting cloudy saturated solution was then placed in a 40° C. incubator for about ½ hour and afterwards it was allowed to cool to ambient temperature. The solids were separated from the resulting suspension by filtration to give solid crystalline $BF_3$-diethyl carbonate complex. Based on titration results of a sample of the filtrate and assuming the filtrate is $BF_3$-diethyl carbonate plus residual diethyl carbonate, the yield of $BF_3$-diethyl carbonate complex was about 80%.

A series of 18650 batteries was then constructed as in the Comparative Examples above except that varying amounts of the fade reducing additive $BF_3$-diethyl carbonate complex were dissolved in the electrolyte prior to assembly. The amounts employed were 1.5%, 2%, 2.5%, and 5% by weight in the electrolyte. The batteries were then electrically conditioned and underwent several similar performance and safety tests (again in sets of two or more).

FIG. 2 shows the discharge capacity versus cycle number data for representative batteries having 1.5%, 2.5%, and 5% additive which were cycle tested at 40° C. to a 4.2 V upper cutoff. Again, discharge and charge currents were 1 A and limited to 1 A maximum respectively. A substantial improvement in the fade rate is achieved in batteries comprising the additive. However, the battery with 5% $BF_3$-diethyl carbonate complex additive shows noticeably less capacity than the Comparative battery at early cycle numbers.

FIGS. 3b and c show discharge and charge profiles for cycle numbers 10 and 200 of representative batteries having 1.5% and 5% $BF_3$-diethyl carbonate complex additive respectively. The impedance increase with cycling seen in a Comparative battery (FIG. 3a) is progressively reduced as the amount of additive is increased.

FIG. 4 shows the discharge capacity versus cycle number data for a representative battery having 1.5% $BF_3$-diethyl carbonate complex additive which was cycle tested at 21° C. to a 4.2 V upper cutoff and had been stored at 60° C. for 7 days. (Again, discharge and charge currents were 1 A and limited to 1 A maximum respectively.) The fade rate is better than that of a Comparative battery with no additive.

To determine what amount of additive might be excessive with regards to the thermal stability threshold, 'hot box' safety tests as in the Comparative Example above were performed on sets of batteries comprising varied amounts of $BF_3$-diethyl carbonate complex additive. In batteries with 1.5% and 2% additive, the safety vent activated but there was no fire nor violent venting. However, of two batteries tested with 2.5% additive, one vented with significant smoke and the other caught fire. Thus, a 2.5% level of $BF_3$-diethyl carbonate complex additive seemed to adversely affect the thermal threshold stability of these particular batteries.

ii) $BF_3$-ethyl Methyl Carbonate Complex Additive

A $BF_3$-ethyl methyl carbonate complex compound was prepared in a manner similar to that used to prepare the $BF_3$-diethyl carbonate complex in Inventive Example i) above. The filtrate of the prepared suspension was solid crystalline $BF_3$-ethyl methyl carbonate complex. Again, a yield of about 80% was obtained.

A series of 18650 batteries was then constructed as in the Comparative Examples above except that the electrolyte comprised a solvent mixture of ethylene carbonate (EC) and ethyl methyl carbonate (EMC) solvents in a volume ratio of 30/70 respectively and varying amounts of the fade reducing additive $BF_3$-ethyl methyl carbonate complex were dissolved in the electrolyte prior to assembly. The amounts employed were 1.5% and 2.5% by weight in the electrolyte. The batteries were then electrically conditioned and are undergoing cycle testing at both 21° C. and 40° C. to a 4.2 V upper cutoff. To date, the fade rate is similar to that of the batteries of Inventive Example i) above.

iii) $BF_3$-phosphoric Acid Complex Additive 18650 batteries were constructed as in the Comparative Example except that 1.4% by weight of boron trifluoride phosphoric acid complex additive (obtained from the Aldrich chemical company in Wis., USA) was dissolved in the electrolyte prior to assembly.

The batteries were then electrically conditioned and underwent several cycle life performance tests. FIG. 5 shows the discharge capacity versus cycle number data for a representative battery which was cycle tested at 21° C. to a 4.1 V upper cutoff. Again, discharge and charge currents were 1 A and limited to 1 A maximum respectively. The battery comprising the $BF_3$-phosphoric acid additive has a significantly improved fade rate over that of the comparative battery.

FIG. 6 shows the discharge capacity versus cycle number data for a representative battery which was cycle tested at 21° C. to a 4.2 V upper cutoff and had been stored at 85° C. for 10 hours. Her and charge currents were 1.5 A and limited to 1.5 A maximum respectively. Again, the battery comprising the $BF_3$-phosphoric acid additive has a significantly improved fade rate over that of the comparative battery.

iv) $BF_3$-diethyl Etherate Complex Additive 18650 batteries were constructed as in the Comparative Example except that 1.2% by weight of boron trifluoride diethyl etherate complex additive (obtained from the Aldrich chemical company) was dissolved in the electrolyte prior to assembly.

The batteries were then electrically conditioned and underwent several cycle life performance tests. FIG. 5 shows the discharge capacity versus cycle number data for a representative battery which was cycle tested at 21° C. to a 4.1 V upper cutoff. Again, discharge and charge currents were 1 A and limited to 1 A maximum respectively. The battery comprising the $BF_3$-diethyl etherate additive has a significantly improved fade rate over that of the Comparative battery. (Note that the data for the battery containing $BF_3$-phosphoric acid above and for this battery containing $BF_3$-diethyl etherate overlap one another and cannot be distinguished in this Figure.)

FIG. 6 shows the discharge capacity versus cycle number data for a representative battery which was cycle tested at 21° C. to a 4.2 V upper cutoff and had been stored at 85° C. for 10 hours. Discharge an charge currents were 1.5 A and limited to 1.5 A maximum respectively. Again, the battery comprising the $BF_3$-diethyl etherate additive has a significantly improved fade rate over that of the Comparative battery. However, the fade rate is not as good as that of the battery of Inventive Example iii) comprising the $BF_3$-phosphoric acid additive.

FIG. 7 shows the discharge capacity versus cycle number data for a representative battery which was cycle tested at 21° C. to a 4.2 V upper cutoff. (Discharge and charge currents here were 1.5 A and limited to 1.5 A maximum respectively.) Surprisingly here, the battery comprising the $BF_3$-diethyl etherate additive actually has a fade rate which is substantially inferior to that of a Comparative battery. As will be shown below, another etherate additive also performs poorly under these conditions. However, batteries comprising etherate additives consistently show improved fade rates when the upper cutoff voltage is 4.1 V. Additionally, as shown in FIG. 6, a battery with an etherate additive can show better fade rate than a Comparative battery, even with a 4.2 V upper cutoff, if the batteries were subjected to extreme high temperature storage conditions. It is speculated that the etherate component may not be compatible with battery chemistries at the slightly higher 4.2 V operating potential. Nonetheless, the benefits of the $BF_3$ component of the additive, which can improve performance after high temperature storage, may outweigh the negative effect of the etherate component at a 4.2 V cutoff and explain the results observed in FIG. 6. (Note that FIG. 7 also shows the discharge capacity versus cycle number data for a representative battery having 1.5% $BF_3$-diethyl carbonate complex additive which was cycle tested without having been stored at high temperature. The cycle testing of this battery differed in that discharge and charge currents were 1.5 A and limited to 1.5 A maximum respectively. The fade rate is slightly better but similar to that of the Comparative battery with no additive. Note however, that this battery was cycled harder and that only about 110 cycles are shown. A fade rate improvement may not be observed in batteries cycled at 21° C. until after 200 or more cycles (see FIG. 5)).

Thus, the etherate additive can provide improved fade rates but not under all circumstances. Etherate additives might be unsuitable overall for use in lithium ion batteries with operating potentials of 4.2 V or greater.

v) $HBF_4$-diethyl Etherate Complex Additive 1 8650 batteries were constructed as in the Comparative Example except that 1.4% by weight of tetrafluoroboric acid diethyl ether complex additive (obtained from the Aldrich chemical company) was dissolved in the electrolyte prior to assembly.

The batteries were then electrically conditioned and underwent several cycle life performance tests. FIG. 5 shows the discharge capacity versus cycle number data for a representative battery which was cycle tested at 21° C. to a 4.1 V upper cutoff. (Again, discharge and charge currents were 1 A and limited to 1 A maximum respectively.) The battery comprising the $HBF_4$-diethyl etherate additive has a significantly improved fade rate over that of the comparative battery.

FIG. 7 shows the discharge capacity versus cycle number data for a representative battery which was cycle tested at 21° C. to a 4.2 V upper cutoff. (Here, discharge and charge currents were 1.5 A and limited to 1.5 A maximum respectively.) As with the battery comprising $BF_3$-diethyl etherate additive of Inventive Example iv), the battery comprising the $HBF_4$-diethyl etherate additive also has a fade rate which is substantially inferior to that of a Comparative battery.

Again, this etherate additive can provide improved fade rates but not under all circumstances.

Etherate additives might be unsuitable overall for use in lithium ion batteries with operating potentials of 4.2 V or greater.

The preceding examples demonstrate that various $BF_3$ and $HBF_4$ complex additives can be effective fade reducing additives in lithium ion batteries. Complexes comprising linear organic carbonates seem preferred since the linear organic carbonate component can be a desired bulk electrolyte solvent component and these additives can be effective in batteries with operating potentials of 4.2 V. Etherate and phosphoric acid based complexes can also be effective but these additives may limit performance under certain conditions and/or be unsuitable if used in larger amounts. ILLUSTRATIVE EXAMPLE Reaction Products of Trimethoxyboroxine in Batteries In the aforementioned Canadian patent application serial no. 2,196,493, trimethoxyboroxine was disclosed as being a preferred fade rate reducing additive in lithium ion batteries. In an attempt to determine what the additive did functionally to improve the fade rate, lithium ion batteries were constructed as described in CA 2,196,493 with trimethoxyboroxine additive dissolved in the electrolyte. After electrical conditioning, the batteries were disassembled and the electrolyte analyzed by atomic absorption. No significant quantity of trimethoxyboroxine remained. Thus, it appeared that the additive had reacted away early on in the life of the battery. It was speculated that the trimethoxyboroxine may have reacted with the small amount of water in the battery or with the lithium salt in the electrolyte. Thus, test solutions of trimethoxyboroxine in electrolyte solvent and either water or lithium salt were prepared to determine what the reaction products in these test solutions were. Impurity FTIR analysis of the test solutions suggested that the boron, which was added to the batteries in the form of trimethoxyboroxine, now existed as $BF_4^-$ anions and thus as a $HBF_4$ decomposition product. $BF_3$ would be an expected intermediate in any reaction which produced $HBF_4$.

Those skilled in the art will be aware that the specific embodiments disclosed in the preceding are merely representative of the invention and that many other variations are possible within the scope of the invention. For example, the aforementioned additives may be expected to provide cycling benefits in lithium metal or polymer electrolyte based batteries as well as in conventional lithium ion batteries. Accordingly, the scope of the invention should be construed by the following claims.

What is claimed is:

1. A non-aqueous rechargeable lithium battery having a reduced capacity fade rate during cycling, the battery including a lithium insertion compound cathode, a lithium compound anode, a separator, a non-aqueous electrolyte including a lithium salt dissolved in a non-aqueous solvent, and an amount of a fade reducing additive comprising a boron fluorine compound selected from the group consisting of $BF_3$, $BF_3$ complexes, $HBF_4$, and $HBF_4$ complexes.

2. A non-aqueous rechargeable lithium battery as claimed in claim 1 wherein the fade reducing additive is a $BF_3$ complex comprising a linear or cyclic organic carbonate.

3. A non-aqueous rechargeable lithium battery as claimed in claim 2 wherein the fade reducing additive is a $BF_3$-diethyl carbonate complex.

4. A non-aqueous rechargeable lithium battery as claimed in claim 2 wherein the fade reducing additive is a $BF_3$-ethyl methyl carbonate complex.

5. A non-aqueous rechargeable lithium battery as claimed in claim 1 wherein the fade reducing additive is a $BF_3$ complex comprising $BF_3$ and a component which is chemically compatible with the cathode, the anode, and the electrolyte.

6. A non-aqueous rechargeable lithium battery as claimed in claim 1 wherein the fade reducing additive is a $BF_3$-diethyl ether complex.

7. A non-aqueous rechargeable lithium battery as claimed in claim 1 wherein the fade reducing additive is a $BF_3$-phosphoric acid complex.

8. A non-aqueous rechargeable lithium battery as claimed in claim 1 wherein the fade reducing additive is a $HBF_4$-diethyl ether complex.

9. A non-aqueous rechargeable lithium battery as claimed in claim 1 wherein the amount of the fade reducing additive is in a range from about 1% to about 5% of the weight of the electrolyte.

10. A non-aqueous rechargeable lithium battery as claimed in claim 1 wherein the amount of the fade reducing additive is less than about 2.5% of the weight of the electrolyte.

11. A non-aqueous rechargeable lithium battery as claimed in claim 1 wherein the fade reducing additive is dissolved in the electrolyte.

12. A non-aqueous rechargeable lithium battery as claimed in claim 1 wherein the cathode comprises a lithium transition metal oxide.

13. A non-aqueous rechargeable lithium battery as claimed in claim 12 wherein the lithium transition metal oxide is $LiCoO_2$.

14. A non-aqueous rechargeable lithium battery as claimed in claim 1 wherein the anode comprises a carbonaceous insertion compound.

15. A non-aqueous rechargeable lithium battery as claimed in claim 14 wherein the carbonaceous insertion compound is graphite.

16. A non-aqueous rechargeable lithium battery as claimed in claim 1 wherein the lithium salt comprises fluorine.

17. A non-aqueous rechargeable lithium battery as claimed in claim 16 wherein the lithium salt is $LiPF_6$.

18. A non-aqueous rechargeable lithium battery as claimed in claim 1 wherein the non-aqueous solvent comprises an organic carbonate.

19. A non-aqueous rechargeable lithium battery as claimed in claim 18 wherein the non-aqueous solvent is a mixture of ethylene carbonate, propylene carbonate, and diethyl carbonate.

20. A non-aqueous rechargeable lithium battery as claimed in claim 18 wherein the non-aqueous solvent additionally comprises biphenyl.

21. A non-aqueous rechargeable lithium battery as claimed in claim 1 wherein the battery is a lithium ion battery with a operating potential of 4.2 volts or greater.

22. A method of reducing the capacity fade rate during cycling of a non-aqueous rechargeable lithium battery, the battery having a lithium insertion compound cathode, a lithium compound anode, a separator, and a non-aqueous electrolyte including a lithium salt dissolved in a non-aqueous solvent, which method comprises:

incorporating into the battery electrolyte an amount of a fade reducing additive compound comprising a boron fluorine compound selected from the group consisting of $BF_3$, $BF_3$ complexes, $HBF_4$, and $HBF_4$ complexes.

23. A method as claimed in claim 22 wherein the fade reducing additive is a $BF_3$ complex comprising a linear or cyclic organic carbonate.

24. A method as claimed in claim 23 wherein the fade reducing additive is a $BF_3$-diethyl carbonate complex.

25. A method as claimed in claim 23 wherein the fade reducing additive is a $BF_3$-ethyl methyl carbonate complex.

26. A method as clained in claim 22 wherein the fade reducing additive is a $BF_3$ complex comprising $BF_3$ and a component which is chemically compatible with the cathode, the anode, and the electrolyte.

27. A method as claimed in claim 22 wherein the fade reducing additive is a $BF_3$-diethyl ether complex.

28. A method as claimed in claim 22 wherein the fade reducing additive is a $BF_3$-phosphoric acid complex.

29. A method as claimed in claim 22 wherein the fade reducing additive is a $HBF_4$-diethyl ether complex.

30. A method as claimed in claim 22 wherein the amount of the fade reducing additive is in a range from about 1% to 5% of the weight of the electrolyte.

31. A method as claimed in claim 22 wherein the amount of the fade rate reducing additive is sufficiently small that the thermal stability threshold of the battery remains essentially unchanged.

32. A method as claimed in claim 31 wherein the amount of the fade reducing additive is less than about 2.5% of the weight of the electrolyte.

33. A method as claimed in claim 22 wherein the fade reducing additive is dissolved in the electrolyte.

34. A non-aqueous rechargeable lithium battery having a reduced capacity fade rate during cycling, the battery including a lithium insertion compound cathode, a lithium or lithium compound anode, a separator, a non-aqueous electrolyte including a lithium salt dissolved in a non-aqueous solvent, and an amount of a fade reducing additive comprising a boron fluorine compound selected from the group consisting of $BF_3$ complexes, $HBF_4$, and $HBF_4$ complexes.

35. A method of reducing the capacity fade rate during cycling of a non-aqueous rechargeable lithium battery, the battery having a lithium insertion compound cathode, a lithium or lithium compound anode, a separator, and a non-aqueous electrolyte including a lithium salt dissolved in a non-aqueous solvent, which method comprises:

incorporating into the battery electrolyte an amount of a fade reducing additive compound comprising a boron fluorine compound selected from the group consisting of $BF_3$ complexes, $HBF_4$, and HBF4 complexes.

\* \* \* \* \*

UNITED STATES PATENT AND TRADEMARK OFFICE
CERTIFICATE OF CORRECTION

PATENT NO. : 6,045,948
DATED : April 4, 2000
INVENTOR(S) : Yu Wang; Meijie Zhang; Ulrich von Sacken; Brian Michael Way It is certified that error appears in the above-identified patent and that said Letters Patent are hereby corrected as shown below:

Title page,
item [57], Abstract, line 7, delete "dietyl" and insert --diethyl--.

Column 1, line 49, delete "$P_2O_3$," and insert --$P_2O_5$--.

Column 4, line 34, delete "$BF_3$-diethl carbonate" and insert --$BF_3$-diethyl carbonate--.

Column 6, line 2, delete "$BF_3$-etliyl methyl" and insert --$BF_3$-ethyl methyl--.

Column 11, line 46, delete "Her and charge" and insert --Here, discharge and charge--.

Column 13, lines 19 and 20, "ILLUSTRATIVE EXAMPLE" should appear on the same line.

Column 8, line 54, delete "650 mm" and insert --65 mm--.

Signed and Sealed this

Tenth Day of April, 2001

Attest:

NICHOLAS P. GODICI

Attesting Officer     Acting Director of the United States Patent and Trademark Office